Feb. 26, 1957     W. D. ANDERSON     2,783,104
BALL BEARING SEPARATOR AND METHOD OF MAKING THE SAME
Filed Feb. 29, 1956
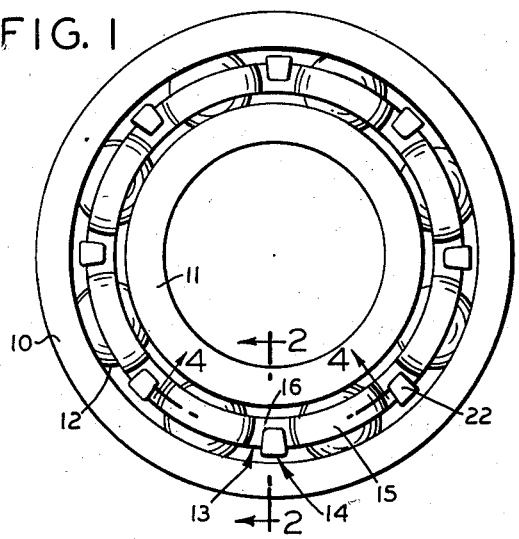
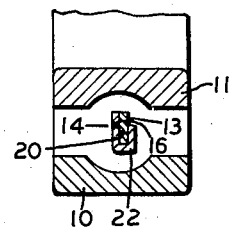
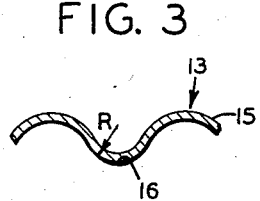
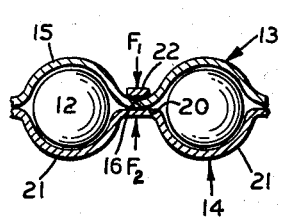
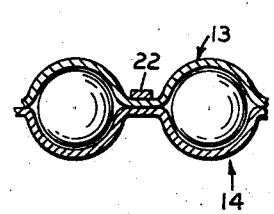
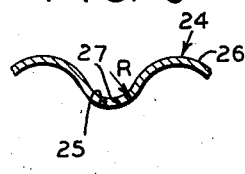
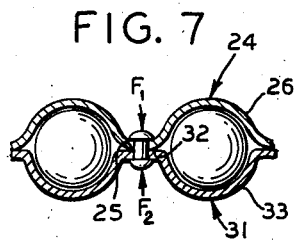
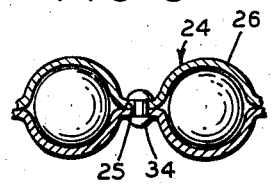
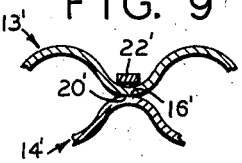
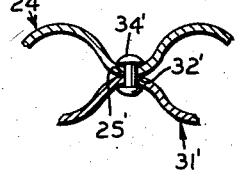
*INVENTOR.*
WARREN D. ANDERSON
BY John P. Chandler
HIS ATTORNEY.

United States Patent Office 2,783,104
Patented Feb. 26, 1957

2,783,104

BALL BEARING SEPARATOR AND METHOD OF MAKING THE SAME

Warren D. Anderson, Glenbrook, Conn., assignor to Norma-Hoffmann Bearings Corporation, Stamford, Conn., a corporation of New York Application February 29, 1956, Serial No. 568,596

9 Claims. (Cl. 308—201)

This invention relates to ball bearings, and relates more particularly to an improved design of ball separator wherein means are provided for adjusting the clearance between the rolling elements and the separator. The invention also relates to a method of adjusting this clearance.

In a deep groove ball bearing, the balls are usually spaced apart by means of a ball separator consisting of two sheet metal rings which are formed to provide hemispherical pockets conforming to the balls, with the two halves of the separator having abutting surfaces in the areas between the balls, these abutting surfaces being held together either by rivets or by a finger or prong of metal integral with one of the rings being bent over the mating flat or land of the other ring.

For proper functioning of the bearing, it is essential that the ball separator conform closely to the balls but still have enough clearance to avoid binding. If the ball separator fits the balls too loosely, it will vibrate, thus causing excessive noise and premature wear and bearing failure. On the other hand, if the separator is too tight on the balls, it impedes free rotation of the balls and may lead to overheating when operated at high speed. These sheet metal ball separators are produced in precision dies which cut and form the sheet metal to the desired shape. However, even with extreme care in the design and use of these dies, the clearance between the balls and the ball separator varies to a greater extent than is desirable.

An important object of the present invention is to provide a novel ball bearing separator having means for adjusting this clearance during the operation of assembling the separator over the balls so that the clearance between the balls and separator can be accurately controlled. This is a distinct advance over the practice of the prior art wherein no means whatsoever were provided for adjusting this clearance and if it was found that the balls were confined too closely there was nothing to do but destroy and remove the offending separator and start anew. Conventional separators having mating flats or lands alternating with arcuate or hemispherical portions forming ball pockets, means being provided for securing these mating or abutment surfaces together.

The more closely the hemispherical pockets embrace the rolling elements while still allowing complete freedom of rotational and other movement thereof, the more accurately will the separator be positioned on the balls. In order to more accurately control this clearance the present invention provides the worker who is assembling the bearing with means for adjusting this clearance by varying the force used in locking the separator rings together.

In the drawing:

Fig. 1 is a side elevation of a completely assembled ball bearing of the present invention comprising grooved inner and outer races, a complement of balls, and stamped sheet metal separators held together by bent metal prongs.

Fig. 2 is a broken section taken on line 2—2 of Fig. 1.

Fig. 3 is a broken section of one separator ring showing two ball enclosing sections joined by a curved land or abutment section.

Fig. 4 is a broken section taken on line 4—4 of Fig. 1.

Fig. 5 is similar to Fig. 4 but shows the result when the prong has been additionally compressed in the direction of the abutment surface which carries the prong, thus bringing the complemental hemispherical portions closer together and reducing the clearance between the latter and the balls.

Fig. 6 is similar to Fig. 2 except that a rivet hole is provided instead of the prong.

Fig. 7 shows the position of the parts on initial assembly.

Fig. 8 shows the result of employing additional pressure to head the rivet.

Fig. 9 is a fragmentary view similar to Fig. 4 but showing both land portions forming the abutment surfaces to be curved.

Fig. 10 is similar to Fig. 7 but showing both abutment surfaces to be curved.

Referring to Figs. 1 and 2 of the drawing, the completed bearing assembly includes a grooved outer race 10, a grooved inner race 11, a plurality of balls 12 and a pair of complemental separator rings 13 and 14, each made from a flat annulus stamped out from sheet metal.

Separator ring 13 is formed with a plurality of spaced, hemispherical ball enclosing portions 15 connected by land portions forming curved abutment surfaces 16 which engage a land portion having a flat abutment surface 20 in separator ring 14. The convex face of abutment surface 16 extends in the direction of abutment surface 20 and may be an arc of a circle having the radius R shown in Fig. 3. However surfaces 16 may be other than circular so long as they are generally convex in shape. The land portions forming abutment surfaces 20 merge into the ball enclosing portions 21 and in this ring each land portion is formed with a prong 22 which is bent over the corresponding land portion of separator ring 13. One prong is shown between adjacent balls but in some instances two such prongs may be provided. This prong is normally locked in position by a suitable die which exerts forces $F_1$ and $F_2$ to clamp the prong tightly against the land portion of the other separator ring.

On initial application of these forces the parts will assume the position shown in Fig. 4 and, as shown, curved abutment surface 16 of separator 13 has substantially the same contour as it had initially as shown in Fig. 3.

By increasing the magnitude of forces $F_1$ and $F_2$ it is possible to progressively flatten abutment surfaces 16 as shown in Fig. 5 and thus through plastic flow of the metal cause the hemispherical portions 15 and 21 of the separators to approach each other, thus effecting a reduction of the clearance between the balls and the hemispherical pockets of the separator. It will be noted that Fig. 4 shows a greater clearance between the hemispherical portion and the ball than does Fig. 5. Forces $F_1$ and $F_2$ may conveniently be furnished by a suitable hydraulic press equipped with an adjustable pressure regulator.

After the initial application of pressure the operator tests the clearance between the balls and the pockets and in case the clearance is too great the operator adjusts the pressure regulator to increase forces $F_1$ and $F_2$. Care must be taken to avoid too great a compressive action since it is difficult to increase the clearance after the parts have been compressed.

By way of example, I have found that for a bearing designated by the Anti-Friction Bearing Manufacturers' Association as 17BC02, a retainer formed of sheet metal .025" thick and a radius R of 0.340" provides a suitable design. A number of retainers, made to the above dimensions, were assembled into bearings. These bearings were divided into three groups and each group was assembled using several different values for the equal forces $F_1$ and $F_2$. The radial movement of the retainer relative to the balls under a light reversing force was then measured. The results are indicated in the following tabulation:

|  | Group 1 | Group 2 | Group 3 |
| --- | --- | --- | --- |
| $F_1=F_2=$ _____lbs__ | 1,500 | 2,000 | 2,500 |
| Average radial movement of separator_____in__ | 0.006 | 0.004 | 0.002 |

It will be noted from the above tabulation that the clearance between the separator and the balls can be readily adjusted by selecting a suitable value for forces $F_1$ and $F_2$.

It is frequently desirable, particularly for the larger sizes of bearings, to hold the two halves of the ball separator together by means of a rivet rather than the bent metal prong previously described. Figs. 6, 7 and 8 show such an arrangement. In Fig. 6 the separator ring 24 has a land portion 25 forming a curved abutment surface, the latter lying between two ball enclosing portions 26. The land portion is provided with a central rivet hole 27.

The other separator 31 has a flat apertured land portion 32 and ball enclosing sections 33. After the spherical pockets of the separator rings have been assembled over the balls rivets 34 are placed in the aligned holes in the rings and the rivets are then headed by application of forces $F_1$ and $F_2$ through suitable dies. The initial application of force produces the result of Fig. 7 and if the balls have too much freedom the effective length of the rivet between the heads is reduced to produce the effect of Fig. 8 wherein both abutment surfaces are substantially flat.

In Figs. 3 and 6 one abutment surface was shown as being curved and the other flat. In Fig. 9 a modification is shown wherein both abutment surfaces 16' and 20' in separator rings 13' and 14', respectively, are curved and prong 22' extends from the land portion forming the latter abutment surface. This arrangement allows for a larger means of adjustability should that become desirable. The same arrangement is shown in Fig. 10 wherein rings 24' and 31' each have curved abutment surfaces 25' and 32' and a rivet 34' secures the two land portions together.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. In a ball bearing having a grooved inner race, a grooved outer race, and a complement of balls located between said grooves, a ball separator consisting of two sheet metal rings located on opposite sides of the ball complement and formed to conform to the ball surfaces and to provide clamped abutment surfaces in the area between adjacent balls, with at least one of said formed rings having curved abutment surfaces.

2. A ball bearing comprising a grooved inner race, a grooved outer race, a complement of balls located between said grooves, and a ball separator consisting of two sheet metal rings located on opposite sides of the ball complement and formed to provide ball enclosing portions and to provide abutment surfaces in the areas between the balls, the abutment surfaces on at least one of the rings being curved, and deformable means securing each pair of abutment surfaces together when a force is applied thereto to move said means in the direction of the curved surface, whereby an increased application of force causes a flattening of the curved surface and a drawing of the ball enclosing portions toward each other.

3. In a ball bearing having a grooved inner race, a grooved outer race, and a complement of balls located between said grooves, a ball separator consisting of two sheet metal rings located on opposite sides of the ball complement and formed to conform to the ball surfaces and to provide clamped abutment surfaces in the area between adjacent balls, with at least one of said formed rings having curved abutment surfaces, one of said sheet metal rings having integral prongs bent around the other ring by an application of force to hold said abutment surfaces together, whereby the application of additional force against the prongs tends to flatten out the curved abutment surfaces and draw the ball enclosing portion of the rings closer together.

4. A ball bearing comprising a grooved inner race, a grooved outer race, a complement of balls located between said grooves, and a ball separator consisting of two sheet metal rings located on opposite sides of the ball complement and formed to provide ball enclosing portions and to provide abutment surfaces in the areas between the balls, the abutment surfaces on at least one of the rings being curved, prongs formed integrally with the abutment surfaces of the other ring and being bent around and compressed against the outside face of said curved surface, whereby an increase in compression on the prong tends to flatten out the curved surface and reduce the distance between the ball enclosing portions.

5. In a ball bearing having a grooved inner race, a grooved outer race, and a complement of balls located between said grooves, a ball separator consisting of two sheet metal rings located on opposite sides of the ball complement and formed to conform to the ball surface and to provide clamped abutment surfaces in the area between adjacent balls, with at least one of said formed rings having curved abutment surfaces, said sheet metal rings being held together by headed rivets, whereby a reduction in the effective lengths of the rivets draws the ball enclosing portions closer together.

6. A ball bearing comprising a grooved inner race, a grooved outer race, a complement of balls located between said grooves, and a ball separator consisting of two sheet metal rings located on opposite sides of the ball complement and formed to provide ball enclosing portions and to provide abutment surfaces in the areas between the balls, the abutment surfaces on at least one of the rings being convexly curved in the direction of the abutment surfaces of the other ring, headed rivets connecting the abutment surfaces, whereby a reduction in the effective length of the rivet tends to flatten out the curved surfaces and reduce the distance between the ball enclosing portions.

7. In a ball bearing having inner and outer grooved races, a complement of balls and a ball separator consisting of two sheet metal rings located on opposite sides of the ball complement and provided with alternate ball enclosing portions and abutment portions which are clamped together, the method of reducing the clearance between the pairs of ball enclosing portions which consists in curving the abutment portions in at least one ring, and then progressively reducing the length of the clamping means to progressively flatten the convex surfaces.

8. In a ball bearing having inner and outer grooved races, a complement of balls and a ball separator consisting of two sheet metal rings located on opposite sides of the ball complement and provided with alternate ball enclosing portions and abutment portions which are secured together by prongs carried by one of the abutment portions, the method of reducing the clearance between the pairs of ball enclosing portions which consists in curving the abutment portions in at least one ring, and then progressively compressing the prongs over the other abutment surfaces.

9. In a ball bearing having inner and outer grooved races, a complement of balls and a ball separator consisting of two sheet metal rings located on opposite sides of the ball complement and provided with alternate ball enclosing portions and abutment portions which are secured together by headed rivets, the method of reducing the clearance between the pairs of ball enclosing portions which consists in curving the abutment portions in at least one ring, and then progressively reducing the effective length of the rivets.

References Cited in the file of this patent

UNITED STATES PATENTS

| 1,459,858 | Parsons | June 26, 1923 |
| 1,463,299 | Staake | July 31, 1923 |

FOREIGN PATENTS

| 925,203 | Germany | Mar. 14, 1955 |